(12) United States Patent
Jeon

(10) Patent No.: US 7,229,193 B2
(45) Date of Patent: Jun. 12, 2007

(54) BACKLIGHT UNIT

(75) Inventor: Seong Man Jeon, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 141 days.

(21) Appl. No.: 10/951,780

(22) Filed: Sep. 29, 2004

(65) Prior Publication Data

US 2005/0083712 A1    Apr. 21, 2005

(30) Foreign Application Priority Data

Oct. 21, 2003   (KR)   .................. 10-2003-0073384

(51) Int. Cl.
- F21S 4/00    (2006.01)
- F21V 5/00    (2006.01)
- F21V 7/00    (2006.01)
- F21V 7/04    (2006.01)
- G09F 13/00   (2006.01)

(52) U.S. Cl. .............. 362/225; 362/224; 362/219; 362/330; 362/346; 362/560

(58) Field of Classification Search .............. 362/219, 362/223–224, 225, 560, 29, 30, 330, 346, 362/611–614

See application file for complete search history.

(56) References Cited

U.S. PATENT DOCUMENTS

| | | | | |
|---|---|---|---|---|
| 5,755,507 A | * | 5/1998 | Hucks | 362/219 |
| 6,027,230 A | * | 2/2000 | Huber et al. | 362/260 |
| 6,033,092 A | * | 3/2000 | Simon | 362/298 |
| 6,431,726 B1 | * | 8/2002 | Barton | 362/220 |
| 6,674,250 B2 | * | 1/2004 | Cho et al. | 315/291 |
| 6,798,150 B2 | * | 9/2004 | Moon | 315/169.3 |
| 6,857,759 B2 | * | 2/2005 | Lee et al. | 362/225 |
| 6,939,020 B2 | * | 9/2005 | Lim | 362/97 |
| 7,055,985 B2 | * | 6/2006 | Chou et al. | 362/225 |
| 2003/0035283 A1 | * | 2/2003 | Lim | 362/97 |
| 2004/0140773 A1 | * | 7/2004 | Moon | 315/120 |
| 2004/0257793 A1 | * | 12/2004 | Wakabayashi | 362/31 |
| 2005/0265047 A1 | * | 12/2005 | Yun et al. | 362/611 |

FOREIGN PATENT DOCUMENTS

| | | |
|---|---|---|
| KR | 2002-0068552 A | 8/2002 |
| KR | 2003-0015534 A | 2/2003 |

* cited by examiner

*Primary Examiner*—John Anthony Ward
*Assistant Examiner*—David Makiya
(74) *Attorney, Agent, or Firm*—Birch, Stewart, Kolasch & Birch, LLP

(57) ABSTRACT

A backlight unit, suitable for a large sized LCD device, includes a plurality of fluorescent lamps alternately provided under an LCD panel in at least two parts, formed by dividing a light-emitting surface. Adjacent end parts of the fluorescent lamps are overlapped partially. Each fluorescent lamp is shorter than a length (e.g., horizontal dimension) of the light-emitting surface. A reflective plate is provided below the plurality of fluorescent lamps, and has a rugged part underlying the overlapped portion of the fluorescent lamps. Alternatively or in addition, a light-scattering pattern can be provided in a portion of a light-scattering means, over the overlapped portion of the fluorescent lamps. The rugged part and/or light-scattering pattern prevents obscure rays in the overlapped portion and improves a uniformity of luminance of the backlight unit.

43 Claims, 6 Drawing Sheets

BACKLIGHT UNIT

This application claims the benefit of the Korean Application No. 10-2003-0073384 filed on Oct. 21, 2003, which is hereby incorporated by reference.

BACKGROUND OF THE INVENTION

1. Field of the Invention

The present invention relates to a backlight unit, and more particularly, to a backlight unit suitable for a large sized LCD device having improved uniformity of luminance.

2. Discussion of the Related Art

A cathode ray tube (CRT), has been widely used for computer monitors and televisions. However, the CRT is heavy and bulky. Thus, display devices, such as a liquid crystal display (LCD), a plasma display panel (PDP) and an electroluminescene display (ELD), have been substituted for the CRT. Among the alternative display devices, the LCD device has been very popular due to the LCD device having a low power consumption, thin profile and lightness in weight. The LCD device has been employed as a monitor for a desktop computer, a large sized television display device, as well as for a laptop computer.

Most LCD devices control the light transmittance from ambient light to display images. In this respect, it is necessary to form an additional light source, such as a backlight unit in an LCD panel. In general, the backlight unit, used as the light source of the LCD device, has a cylindrical fluorescent lamp, which is classified into two types, a direct type and an edge type, according to a disposition of the fluorescent lamp.

In the edge type backlight unit, a lamp unit is provided at one side of a light-guiding plate. The lamp unit is provided with a lamp emitting light. A lamp holder is inserted into both ends of the lamp to protect the lamp. A reflective plate has one side inserted to the light-guiding plate and surrounds the circumference of the lamp, to reflect the light emitted from the lamp to the light-guiding plate. The edge type backlight unit is generally applied to relatively small sized LCD devices, such as the monitors of the laptop computer and the desktop computer. The edge type backlight is advantageous in that it has great uniformity of light, long life span, and a thin profile.

The direct type backlight unit is suitable for a large sized LCD device of 20 inches or more. The direct type backlight unit includes a plurality of lamps arranged in one direction below a light-diffusion plate to directly illuminate an entire surface of the LCD panel with light. The direct type backlight unit has great light efficiency and is commonly used for the large sized LCD devices requiring high luminance, such as televisions.

A related art backlight unit for an LCD device will be described with reference to the accompanying drawings. FIG. 1 is a perspective view of a direct type backlight unit, according to the related art. FIG. 2 is a plane view of the arrangement of fluorescent lamps in a direct type backlight unit, according to the related art. FIG. 3 is a plane view of the arrangement of fluorescent lamps in a direct type backlight unit, according to another embodiment of the related art.

As shown in FIG. 1 and FIG. 2, the backlight unit according to the related art includes a plurality of fluorescent lamps 1, an outer case 3, and light-scattering means 5a, 5b and 5c. The outer case 3 fixes and supports the plurality of fluorescent lamps 1, and the light-scattering means 5a, 5b and 5c are provided between the fluorescent lamps 1 and an LCD panel (not shown). The light-scattering means 5a, 5b and 5c prevent the silhouette of the fluorescent lamps 1 from being reflected on a display surface of the LCD panel (not shown), and provide a light source with uniform luminance. For improving the light-scattering effect, the light-scattering means includes a diffusion plate 5a, a prism sheet 5b, and a protection sheet 5c. Also, a reflective plate 7 is provided inside the outer case 3 for concentrating the light emitted from the fluorescent lamps 1 to the display part of the LCD panel.

Each fluorescent lamp 1 is a cold cathode fluorescent lamp (CCFL) 1. Electrode parts 2a and 2b are provided at both ends in a tube of the CCFL, and power supplying wires 9a and 9b are respectively connected with the electrode parts 2a and 2b. Both ends of the fluorescent lamp 1 are inserted into and fixed to both sides of the outer case 3. In this state, as a voltage is applied to the electrode parts 2a and 2b, through the power supplying wires 9a and 9b, the fluorescent lamp 1 emits light, and the fluorescent lamp 1 provides light for the LCD device. Although not shown, the voltage applied to the power supplying wires 9a and 9b is provided from an inverter, wherein the inverter is provided at the rear of the outer case 3.

In the direct type backlight unit, according to the related art as shown in FIG. 2, the fluorescent lamps 1 are provided at fixed intervals and have a length corresponding to a horizontal line of a light-emitting surface of the backlight unit. Accordingly, the length of the fluorescent lamp 1 increases with an increase in the horizontal length of the light-emitting surface of the backlight unit. For example, if the LCD device has a size of 30 inches to 40 inches, it is necessary to employ fluorescent lamps having a length of 700□ or more.

As the length of the fluorescent lamp increases, the fabrication process of the fluorescent lamp becomes more difficult. Also, when a relatively long fluorescent lamp is disposed in the backlight unit, the assembling process is complicated. Furthermore, the backlight unit is more susceptible to damage by external forces. In addition, when driving the fluorescent lamp, it is difficult to realize uniform luminance. Also, it is required to maintain a high driving voltage, which may lead to the problem of electro magnetic interference (EMI) by an electric interference of a driving circuit for obtaining stability and driving the LCD panel.

To solve these problems, a different design in a direct type backlight unit, according to the related art, is shown in FIG. 3. As shown in FIG. 3, fluorescent lamps 30, each having a length corresponding to a vertical line of the light-emitting surface of the backlight unit, are provided at fixed intervals along a length direction of the light-emitting surface of the backlight unit. Electrode parts 32a and 32b are formed at both ends of a tube in each fluorescent lamp 30, and power supplying wires 33a and 33b are connected with the electrode parts 32a and 32b. The backlight unit also includes a reflective plate 31.

However, as shown in FIG. 3, if the fluorescent lamps 30 extend in the vertical direction of the light-emitting surface of the backlight unit, hydrargyrum moves in the tube of the fluorescent lamp 30 downward. This movement of the hydrargyrum deteriorates the characteristics of the fluorescent lamp 30. As a result, it is impossible to obtain uniformity of luminance.

SUMMARY OF THE INVENTION

Accordingly, the present invention is directed to a backlight unit that substantially obviates one or more problems due to limitations and disadvantages of the related art.

An object of the present invention is to provide to a backlight unit suitable for a large sized LCD device having a characterizing disposition of fluorescent lamps. Each fluorescent lamp is shorter than a horizontal length of a light-emitting surface of the backlight unit. The lamps are fixed at intervals along a width (vertical) direction of the light-emitting surface. This arrangement improves the endurance of the backlight unit. Also, it is possible to realize a simplified fabrication process of the fluorescent lamp and simplified assembling process of the backlight unit, and to prevent obscure rays in an overlapped portion of the fluorescent lamps.

To achieve these objects and other advantages and in accordance with the present invention, a backlight unit includes a plurality of fluorescent lamps alternately provided under an LCD panel in at least two parts formed by dividing a light-emitting surface. Adjacent end parts of the fluorescent lamps are overlapped partially. Each fluorescent lamp is shorter than a horizontal length of the light-emitting surface. A reflective plate is provided below the plurality of fluorescent lamps. A rugged part on the reflective plate, corresponds to the overlapped portion of the fluorescent lamps.

In another aspect, a backlight unit includes a plurality of fluorescent lamps alternately provided under an LCD panel in at least two parts formed by dividing a light-emitting surface. Adjacent end parts of the fluorescent lamps are overlapped partially. Each fluorescent lamp is shorter than a horizontal length of the light-emitting surface. A reflective plate is provided below the plurality of fluorescent lamps. A reflective sheet is provided on the reflective plate, corresponding to the overlapped portion of the fluorescent lamps. The reflective sheet may be formed of MCPET or ALSET (which is a trademark referring to a reflective layer, such as E60L, which is attached by an adhesive layer to a substrate, such as aluminum or brass).

In yet another aspect, a backlight unit includes a plurality of fluorescent lamps alternately provided under an LCD panel in at least two parts formed by dividing a light-emitting surface. Adjacent end parts of the fluorescent lamps are overlapped partially. Each fluorescent lamp is shorter than a horizontal length of the light-emitting surface. An outer case supports the fluorescent lamps. A reflective plate is provided inside the outer case below the plurality of fluorescent lamps. Light-scattering means are provided on the plurality of fluorescent lamps. A light-scattering pattern is provided on the light-scattering means, corresponding to the overlapped portion of the fluorescent lamps.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to a backlight unit according to the preferred embodiments of the present invention, examples of which are illustrated in the accompanying drawings. Wherever possible, the same reference numbers will be used throughout the drawings to refer to the same or like parts.

First and Second Embodiments

Figure 1:
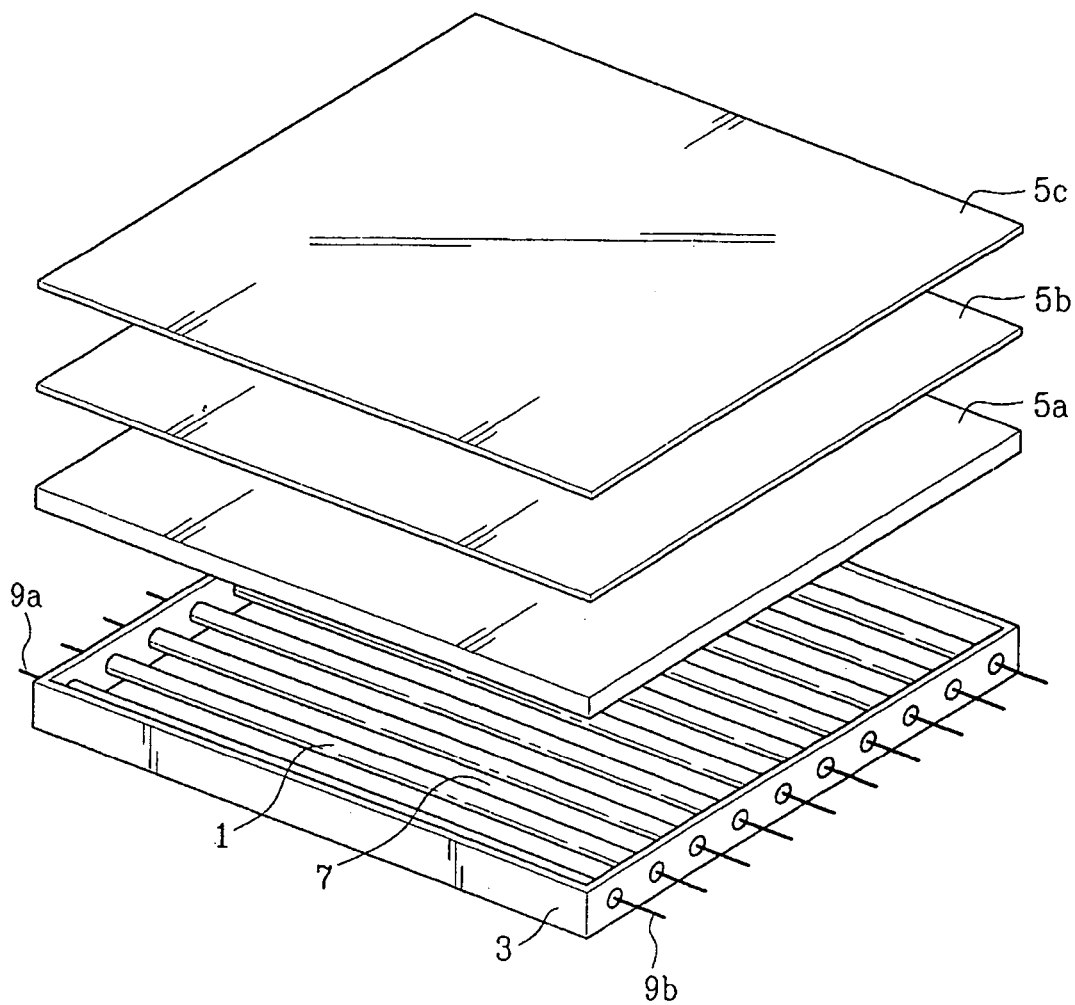
FIG. 1 is a perspective view of a direct type backlight unit, according to the related art.
Figure 2:
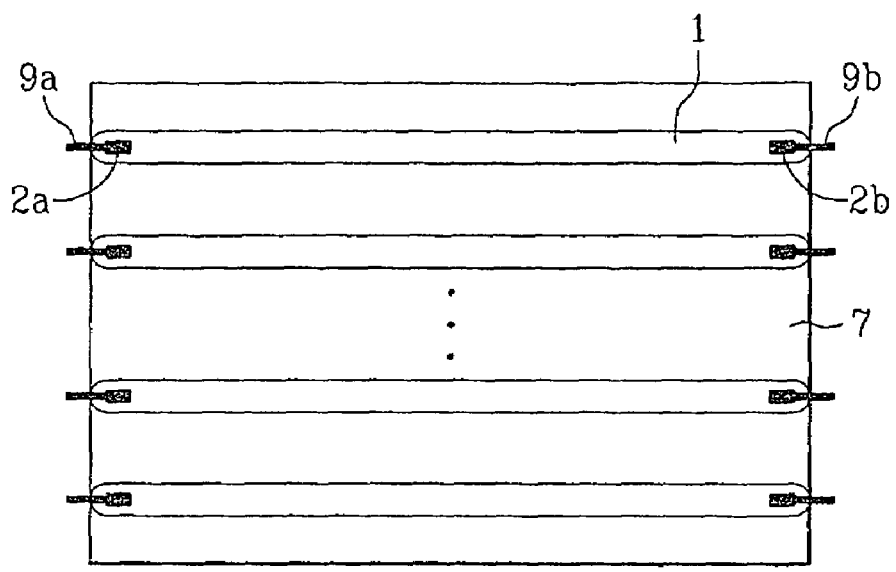
FIG. 2 is a plane view of the arrangement of fluorescent lamps in a direct type backlight unit, according to the related art.
Figure 3:
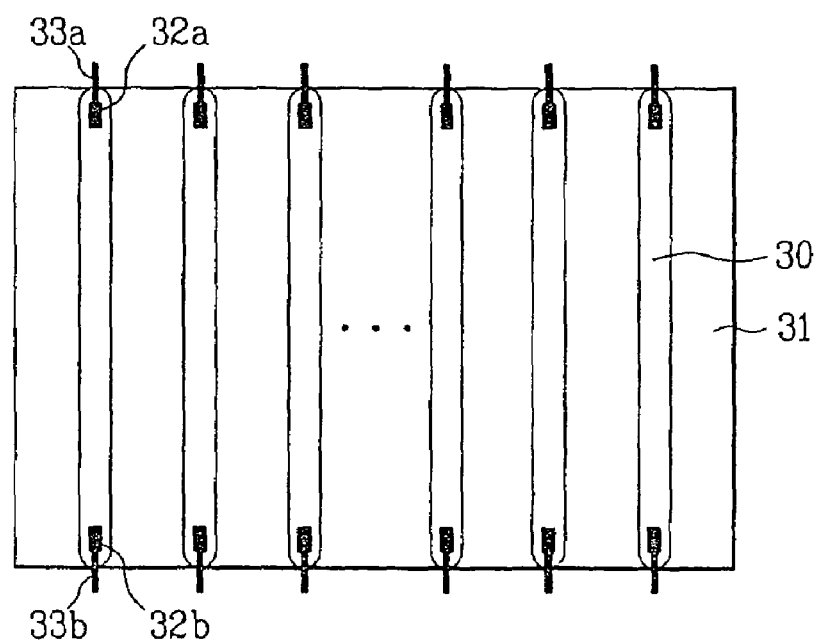
FIG. 3 is a plane view of the arrangement of fluorescent lamps in a direct type backlight unit, according to another embodiment of the related art.
Figure 4A:
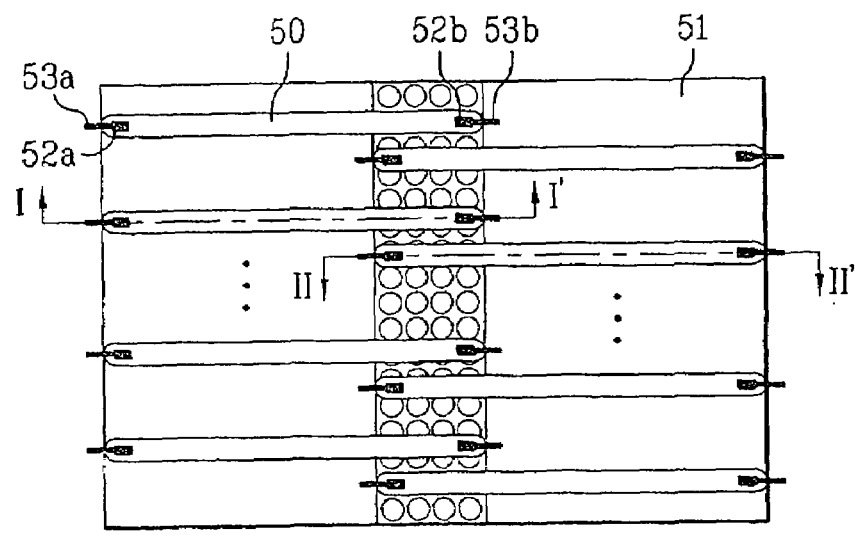
FIG. 4A and FIG. 4B are plane views of the arrangement of backlight units, according to first and second embodiments of the present invention.
Figure 4B:
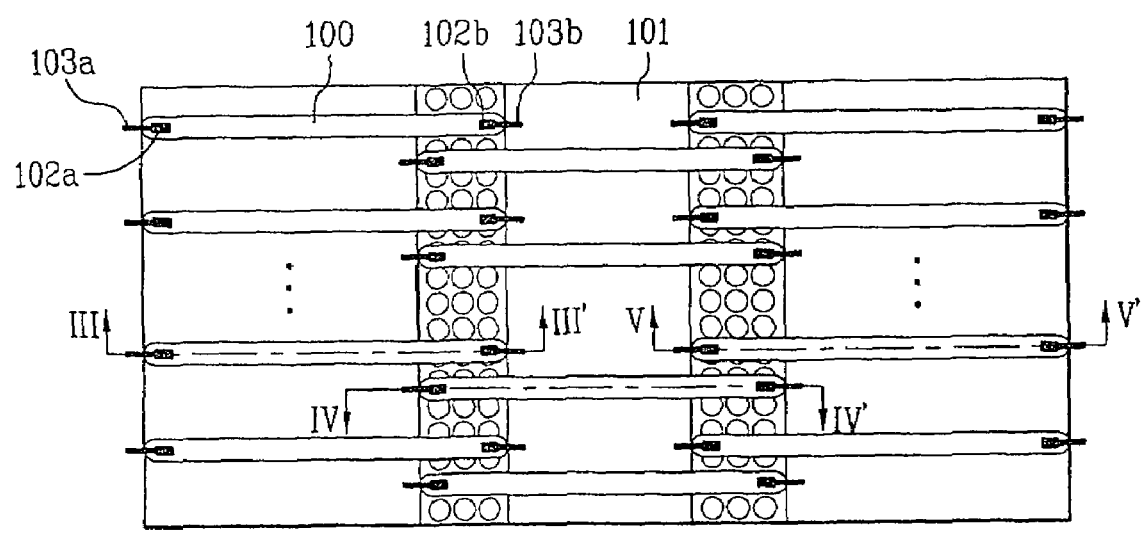

FIG. 4A and FIG. 4B are plane views of the arrangements of backlight units, according to the first and second embodiments of the present invention. In FIG. 4A, a light-emitting surface of a backlight unit is divided into two equal parts. FIG. 4A shows the arrangement of the fluorescent lamps in the two parts. In FIG. 4B, a light-emitting surface of a backlight unit is divided into three equal parts. FIG. 4B shows the arrangement of the fluorescent lamps in the three parts.

Generally, as a display surface of an LCD panel becomes large, it is necessary to increase a length of a light-emitting surface of a backlight unit, thereby increasing a length of a fluorescent lamp. If the fluorescent lamp becomes longer, a lamp voltage applied to the fluorescent lamp increases. Thus, as shown in FIG. 4A and FIG. 4B, in the backlight units according to the first and second embodiments of the present invention, the light-emitting surfaces of the backlight units are divided into at least two parts, and the fluorescent lamp is shorter than the length of the light-emitting surface (approx. 1/n, wherein, 'n' is a natural number above 2). Then, the fluorescent lamps are alternately provided in the parts divided by a division line (imaginary line).

In the embodiment of FIG. 4A, the backlight unit includes a plurality of fluorescent lamps 50, an outer case (not shown), a reflective plate 51, and a light-scattering means (not shown). The fluorescent lamps 50 are alternately provided in two equal parts formed by dividing the light-emitting surface of the backlight unit, along a width (e.g., vertical dimension) direction. Also, the outer case (not shown) supports the fluorescent lamps 50, and the reflective plate 51 is provided inside the outer case to concentrate light emitted from the fluorescent lamps 50 on a display part of an LCD panel. Then, the light-scattering means (not shown) is provided between the fluorescent lamps 50 and the LCD panel (not shown).

As shown in FIG. 4B, the backlight unit includes a plurality of fluorescent lamps 100, an outer case (not shown), a reflective plate 101, and a light-scattering means (not shown). The fluorescent lamps 100 are provided by turns in three equal parts formed by dividing the light-emitting surface of the backlight unit twice, along a width direction. Also, the outer case (not shown) supports the fluorescent lamps 100, and the reflective plate 101 is provided inside the outer case to concentrate light emitted from the fluorescent lamps 100 on a display part of an LCD panel, wherein the reflective plate 101 is formed of a material having relatively high reflexibility, such as aluminum Al. Then, the light-scattering means (not shown) is provided between the fluorescent lamps 100 and the LCD panel (not shown). The light-scattering means prevents the silhouette of the fluorescent lamps from being reflected on a display surface of the LCD panel, and provides a light source with uniform luminance. The light-scattering means includes a diffusion plate, a prism sheet, and a protection sheet.

Referring to FIG. 4A and FIG. 4B, the fluorescent lamps 50 and 100 are provided to have electrode parts 52a and 52b, 102a and 102b disposed in a zigzag pattern, which at least brings the end portions of the fluorescent lamps 50, 100 adjacent to each other, and more preferably overlaps the end portions of the fluorescent lamps 50, 100. However, the present invention is not limited to this zigzag pattern. Although not shown, the electrode parts 52a and 52b, 102a and 102b may be disposed along a line in the overlapped portions of the fluorescent lamps. Or, the fluorescent lamps, of which each is shorter than a length of the light-emitting surface, may be alternately disposed in at least two equal parts divided, wherein the fluorescent lamps have different lengths.

Each fluorescent lamp 50, 100 may be formed of a cold cathode fluorescent lamp (CCFL). The electrode parts 52a and 52b, 102a and 102b are provided at both ends in a tube of the CCFL, and power supplying wires 53a and 53b, 103a and 103b are respectively connected with the electrode parts 52a and 52b, 102a and 102b. When voltage is applied to the electrode parts 52a and 52b, 102a and 102b through the power supplying wires 53a and 53b, 103a and 103b, the fluorescent lamp 50, 100 emits light. The voltage, applied to the power supplying wires 53a and 53b, 103a and 103b, is provided from an inverter (not shown).

However, if the fluorescent 50, 100 lamps are alternately provided in at least two equal parts formed by dividing the light-emitting surface of the backlight unit, picture quality may be deteriorated due to obscure rays in the overlapped portion of the fluorescent lamps 50, 100. In order to solve the problem of the obscure rays, the reflective plate 51, 101 has a rugged part corresponding to the overlapped portion of the fluorescent lamps 50, 100.

Figure 5A:
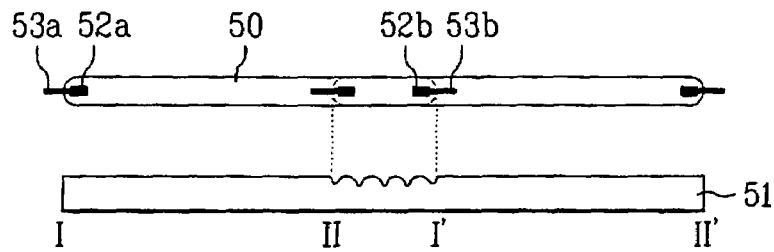
FIG. 5A is a cross sectional view of a backlight unit taken along lines I–I' and II–II' of FIG. 4A.
Figure 5B:
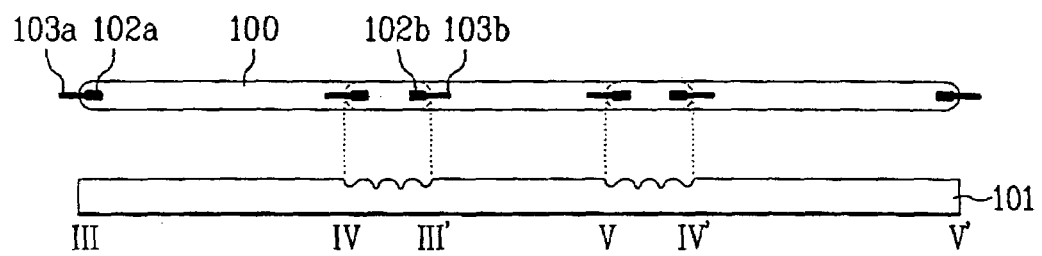
FIG. 5B is a cross sectional view of a backlight unit taken along lines III–III, IV–IV' and V–V' of FIG. 4B.

FIG. 5A and FIG. 5B are cross sectional views of a backlight unit taken along lines I–I' and II–II' of FIG. 4A, and taken along lines III–III', IV–IV' and V–V' of FIG. 4B, according to the first embodiment of the present invention. In FIG. 5A and FIG. 5B, the rugged part of the reflective plate 51, 101 is formed by a method of cutting the reflective plate 51, 101. However, the reflective plate 51, 101 may have a uniform embossing structure, a non-uniform embossing structure, or an irregular structure of another shape. If the reflective plate 51, 101 has the rugged part, underlying the overlapped portion of the fluorescent lamps 50, 100, it has a relatively greater efficiency of reflection in the rugged portion than that in other portions of the reflective plate, thereby preventing obscure rays in the overlapped portion of the fluorescent lamps 50, 100.

Figure 6A:
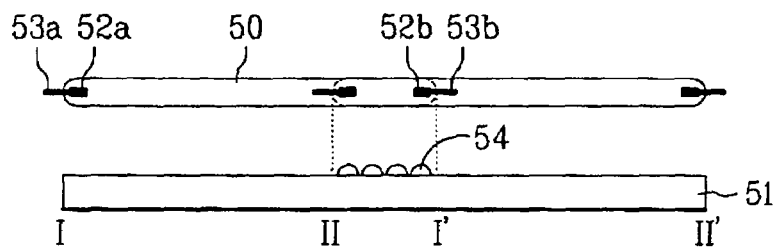
FIG. 6A is a cross sectional view of a backlight unit taken along lines I–I' and II–II' of FIG. 4A and illustrating a second embodiment of the present invention.
Figure 6B:
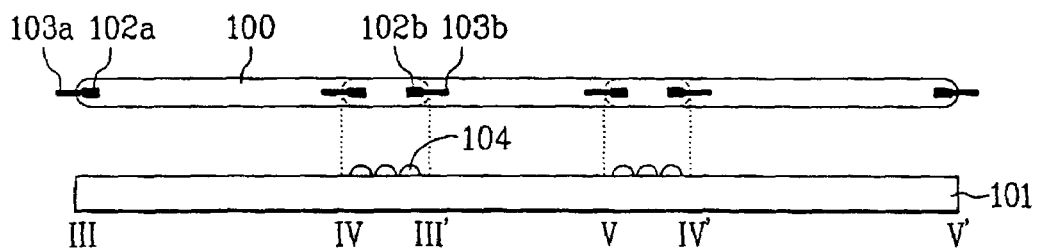
FIG. 6B is a cross sectional view of a backlight unit taken along lines III–III', IV–IV' and V–V' of FIG. 4B, according to the second embodiment of the present invention.

FIG. 6A and FIG. 6B are cross sectional views of a backlight unit taken along lines I–I' and II–II' of FIG. 4A, and taken along lines III–III', IV–IV' and V–V' of FIG. 4B, according to the second embodiment of the present invention. In the backlight unit according the second embodiment of the present invention, as shown in FIG. 6A and FIG. 6B, the reflective surface 51, 101 has a protruding part 54, 104, underlying the overlapped portion of the fluorescent lamps 50, 100. The protruding part 54, 104 may be formed as a uniform embossing structure, a non-uniform embossing structure, or an irregular structure of another shape. The protruding part, underlying the overlapped portion of the fluorescent lamps 50, 100, has a greater efficiency of reflection as compared to other portions of the reflective plate, thereby preventing obscure rays in the overlapped portion of the fluorescent lamps 50, 100.

Although not shown, the light-emitting surface of the backlight unit may be divided into at least two parts or sections having different sizes (as opposed to equal sizes as illustrated), and then the fluorescent lamps are alternately provided in the divided parts. In this alternative embodiment, the rugged part or the protruding part would be provided in the reflective plate underlying to the overlapped portion of the fluorescent lamps, thereby obtaining greater efficiency of reflection than that in other portions of the reflective plate, and preventing the obscure rays in the overlapped portion of the fluorescent lamps.

Third Embodiment

Figure 7A:
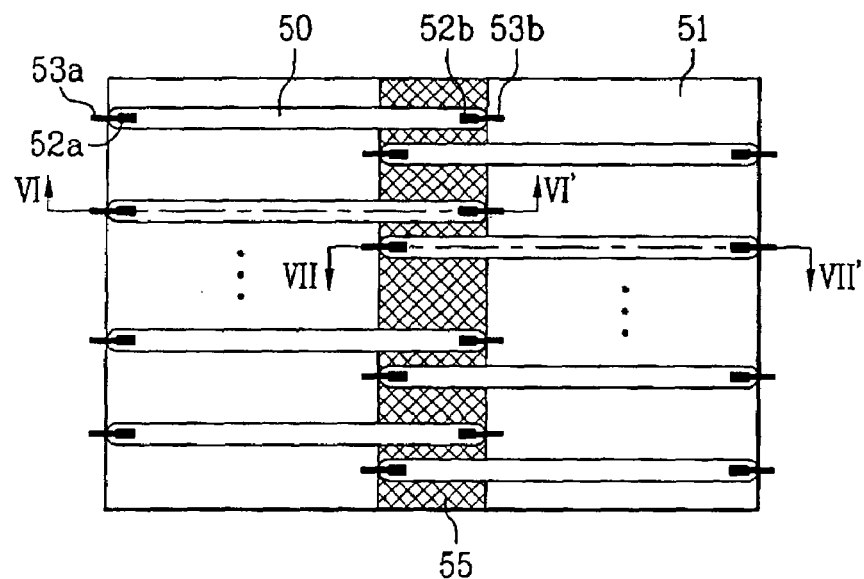
FIG. 7A and FIG. 7B are plane views of the arrangement of a backlight unit according to a third embodiment of the present invention.
Figure 7B:
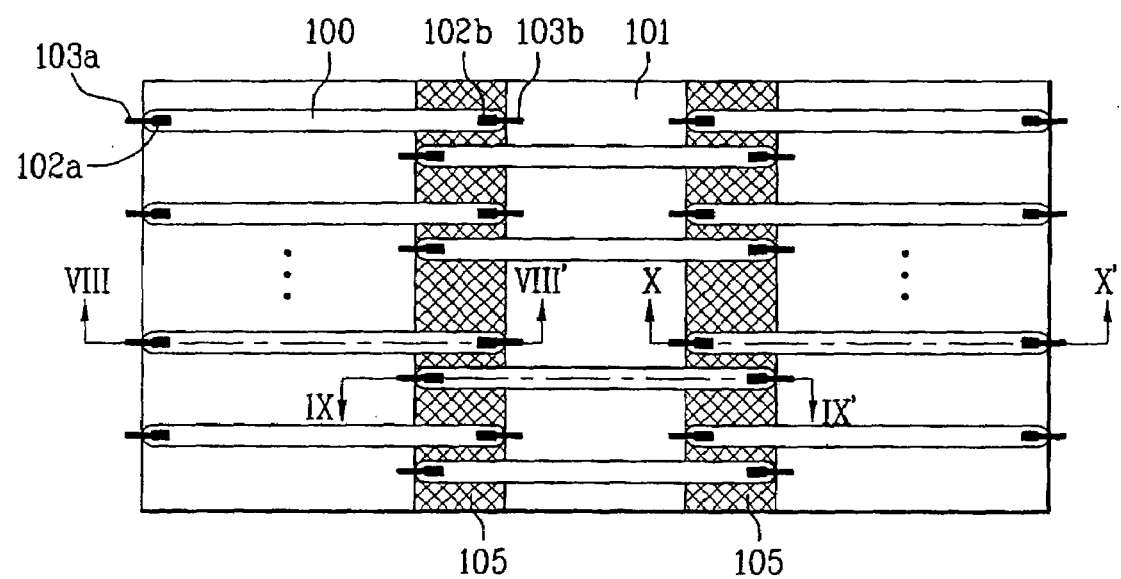
Figure 8A:
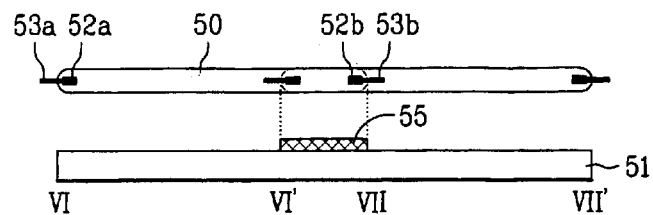
FIG. 8A is a cross sectional view of a backlight unit taken along lines VI–VI' and VII–VII' of FIG. 7A.
Figure 8B:
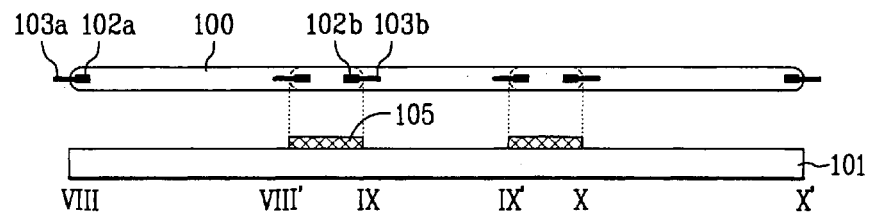
FIG. 8B is a cross sectional view of a backlight unit taken along lines VIII–VIII', IX–IX' and X–X' of FIG. 7B.

FIG. 7A and FIG. 7B are plane views of the arrangement of a backlight unit according to the third embodiment of the present invention. FIG. 8A and FIG. 8B are cross sectional views of a backlight unit taken along lines VI–VI' and VII–VII' of FIG. 7A, and taken along lines VIII–VIII', IX–IX' and X–X' of FIG. 7B, respectively.

In the backlight unit according to the third embodiment of the present invention, as shown in FIG. 7A and FIG. 7B, and FIG. 8A and FIG. 8B, a light-emitting surface is divided into at least two equal parts, and a fluorescent lamp is formed to be shorter than a length (e.g., horizontal dimension) of the light-emitting surface (approx. 1/n, wherein, 'n' is a natural number above 2). The fluorescent lamps are alternately provided in the equal parts divided by a division line (imaginary line).

Instead of forming a rugged part or a protruding part in a reflective plate 51, 101 underlying the overlapped portion(s) of the fluorescent lamps 50, 100, a reflective sheet 55, 105 is adhered on the surface of the reflective plate 51, 105 underlying to the overlapped portion(s) of the fluorescent lamps 50, 100. Then, the remaining portions of the backlight unit according to the third embodiment of the present invention have the same structure as those according to the first and second embodiments of the present invention. The reflective plate 51, 101 may be formed of a material having great reflexibility, such as aluminum Al. The reflective sheet 55, 105, adhered on the surface of the reflective plate 51, 101, may be formed of a reflective material such as MCPET (Micro polyethylene ether phthalein) or ALSET (aluminum/brass+E60L).

Although not shown, the light-emitting surface of the backlight unit may be divided into parts or sections having different sizes (as opposed to equal sizes, as illustrated), and then the fluorescent lamps are alternately provided in the divided parts. In this alternative embodiment, the fluorescent lamp would have different lengths corresponding to the differently sized parts of the backlight unit.

As described above, the reflective sheet 55, 105 is adhered on the surface of the reflective plate 51, 105 corresponding to the overlapped portion of the fluorescent lamps 50, 100, so that the portion of the reflective plate having the reflective sheet has a greater efficiency of reflection than other portions of the reflective plate, thereby preventing obscure rays in the overlapped portion of the fluorescent lamps.

Fourth Embodiment

Figure 9A:
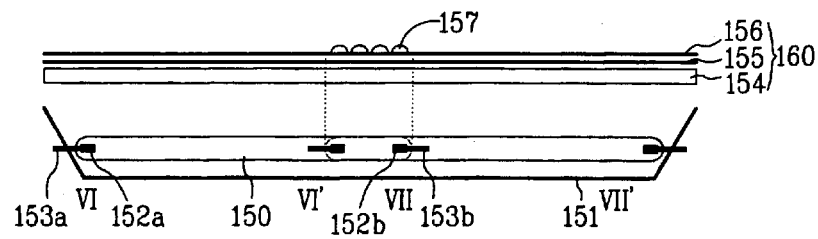
FIG. 9A and FIG. 9B are cross sectional views of a backlight unit, according to the fourth embodiment of the present invention.
Figure 9B:
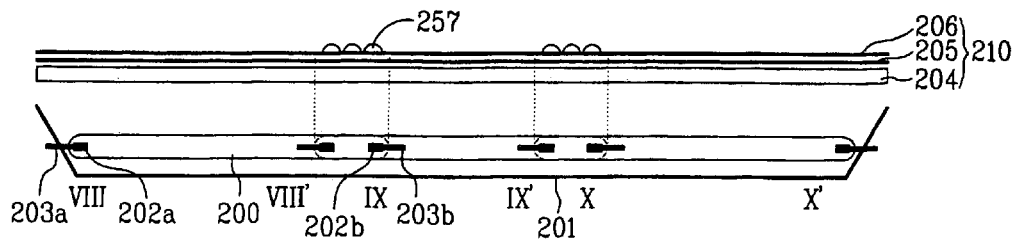

FIG. 9A and FIG. 9B are cross sectional views of a backlight unit according to the fourth embodiment of the present invention. FIG. 9A is a cross sectional view taken along lines VI–VI' and VII–VII' of FIG. 7A. FIG. 9B is a cross sectional view taken along lines VIII–VIII', IX–IX', and X–X' of FIG. 7B.

As shown in FIG. 9A and FIG. 9B, a plurality of fluorescent lamps 150, 200 are disposed in the same manner as those of the first to third embodiments of the present invention, and a light-scattering pattern is formed in light-scattering means 160, 210. The electrode parts 152a and 152b, 202a and 202b are provided at both ends of the lamp, and power supplying wires 153a and 153b, 203a and 203b are respectively connected with the electrode parts 152a and 152b, 202a and 202b.

In FIG. 9A and FIG. 9B, the backlight unit according to the fourth embodiment of the present invention includes the plurality of fluorescent lamps 150, 200, an outer case, a reflective plate 151, 201, the light-scattering means 160, 210, and the light-scattering pattern 157, 257. A light-emitting surface of a backlight unit is divided into at least two equal parts, and the fluorescent lamp is shorter than a length (e.g., horizontal dimension) of the light-emitting surface (approx. 1/n, wherein, 'n' is a natural number above 2). The fluorescent lamps 150, 200 are alternately provided in the parts divided by a division line (imaginary line). The outer case supports the fluorescent lamps 150, 200. The reflective plate 151, 201 is provided inside the outer case to concentrate light emitted from the fluorescent lamps on a display part of an LCD panel. The reflective plate 151, 201 is formed of a material having great reflexibility, such as aluminum Al. The light-scattering means 160, 210 is provided between the plurality of fluorescent lamps 150, 200 and the LCD panel (not shown). The light-scattering pattern 157, 257 is provided on the light-scattering means 160, 210 covering an overlapped portion of the fluorescent lamps 150, 200.

The light-scattering means 160, 210 prevents the silhouette of the fluorescent lamps from being reflected on a display surface of the LCD panel (not shown), and provides a light source with uniform luminance. The light-scattering means 160, 210 is provided with a diffusion plate 154, 204, a prism sheet 155, 205, and a protection sheet 156, 206.

The light-scattering pattern 157, 257 may be coated or printed, or minute materials such as beads or sands of $SiO_2$ or GaAs, having a particle size of a few micro-meters to several tens of micro-meters, may be embedded on the diffusion plate 154, 204, the prism sheet 155, 205, or the protection sheet 156, 206 corresponding to the overlapped portion of the fluorescent lamps 150, 200. As a result, the light-scattering pattern 157, 257 is formed to have an embossed surface on the light-scattering means 160, 210 above the overlapped portion of the fluorescent lamps 150, 200. Preferably, the light-scattering pattern 157, 257 is formed on the diffusion plate 154, 204 or the protection sheet 156, 206.

As described above, the light-scattering pattern 157, 257 is formed on the surface of the light-scattering means 160, 210 corresponding to the adjacent or overlapped portion of the fluorescent lamps 150, 200. The light-scattering pattern 157, 257 has a greater efficiency of light-scattering than other portions of the light-scattering means 160, 210, thereby preventing obscure rays in the overlapped portion of the fluorescent lamps 150, 200.

Although not shown, the light-emitting surface of the backlight unit may be divided into at least two parts having different size (instead of equal sizes as illustrated), and then the fluorescent lamps are alternately provided in the divided parts. In this alternative embodiment, the light-scattering pattern would be provided in the light-scattering means corresponding to the overlapped portion of the fluorescent lamps.

As described above, the preferred embodiments of the present invention are applied to the large sized LCD device to remove the obscure rays in the overlapped portion of the fluorescent lamps, when a plurality of fluorescent lamps are alternately provided in at least two parts formed by dividing the light-emitting surface of the backlight unit, where the fluorescent lamp is shorter than the entire length of the light-emitting surface of the backlight unit.

The preferred embodiments of the present invention have illustrated a backlight unit using CCFL (cold cathode fluorescent lamp) type lamps. However, the present invention may be applied to backlight units using other lamps, such as EEFL (external electrode fluorescent lamp) type lamps.

The backlight unit, according to the present invention, has several advantages. When fabricating the backlight unit for a large sized LCD device, it is possible to use fluorescent lamps having a relatively short length. Thus, it is possible to use fluorescent lamps without regard to the size of the display device.

Also, as the length of the fluorescent lamp becomes short, it is possible to lower the lamp voltage applied to the fluorescent lamp.

In the present invention, the rugged part is provided in the reflective plate corresponding to the overlapped portion of the fluorescent lamps, or the reflective sheet is adhered on the surface of the reflective plate corresponding to the overlapped portion of the fluorescent lamps, so that the portion of the reflective plate having the rugged part or the reflective sheet has greater efficiency of reflection than other portions of the reflective plate, thereby preventing obscure rays in the overlapped portion of the fluorescent lamps.

In the present invention, the light-scattering pattern is formed on the light-scattering means corresponding to the overlapped portion of the fluorescent lamps. The light-scattering pattern has greater efficiency of light scattering than other portions of the light-scattering means, thereby preventing the obscure rays in the overlapped portion of the fluorescent lamps. Accordingly, it is possible to improve uniformity of luminance.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit comprising:
   a case defining a size of said backlight unit, said size having a length and a width;
   a plurality of lamps housed in said case, wherein said case is divided into at least a first area and a second area, a first portion of said plurality of lamps being provided in said first area and extending partially into said second area, a second portion of said plurality of lamps being provided in said second area and extending partially into said first area, such that ends of said second portion of said plurality of lamps in said second area overlap with ends of said first portion of said plurality of lamps in said first area;
   a reflective member provided below said plurality of lamps; and
   a first surface of said reflective member, underlying said overlapped portions of said plurality of lamps, at a juncture of said first and second areas, having a reflection characteristic which is different than surfaces of said reflective member underlying said first and second areas.

2. The backlight unit according to claim 1, wherein said first surface has a better reflection efficiency than said other surfaces of said reflective member.

3. The backlight unit according to claim 1, wherein said first surface is a more rugged surface than said other surfaces of said reflective member.

4. The backlight unit according to claim 1, wherein said case is substantially rectangular in shape.

5. The backlight unit according to claim 1, wherein said length corresponds to a horizontal dimension and said width corresponds to a vertical dimension of an LCD display to receive said back light unit.

6. The backlight unit according to claim 1, wherein each lamp of said plurality of lamps is a fluorescent lamp having a straight tubular shape.

7. The backlight unit according to claim 1, wherein each lamp of said plurality of lamps is a cold cathode fluorescent lamp (CCFL), having terminals at each end.

8. The backlight unit according to claim 1, wherein each lamp of said plurality of lamps is an external electrode fluorescent lamp (EEFL).

9. The backlight unit according to claim 1, wherein said first and second areas are substantially equal in size, with each of said first and second areas having said width of said case and one-half said length of said case.

10. The backlight unit according to claim 1, wherein said case is divided into three areas, a third portion of said plurality of lamps being provided in a third area and extending partially into said second area, such that ends of said third portion of said plurality of lamps in said third area overlap with ends of said second portion of said plurality of lamps in said second area; and
   wherein said reflective member includes a second surface, underlying said overlapped portions of said plurality of lamps, at a juncture of said second and third areas, said second surface having a reflection characteristic which is different than surfaces of said reflective member underlying said first, second and third areas.

11. The backlight unit according to claim 10, wherein said first, second and third areas are substantially equal in size, with each of said first, second and third areas having said width of said case and one-third said length of said case.

12. The backlight unit according to claim 1, wherein each lamp of said plurality of lamps has a same length.

13. The backlight unit according to claim 1, wherein said plurality of lamps includes lamps of differing lengths.

14. The backlight unit according to claim 1, wherein said first surface is formed as concaved portions on said reflective member.

15. The backlight unit according to claim 1, wherein said first surface is formed as protruding portions on said reflective member.

16. The backlight unit according to claim 15, wherein said first surface is formed as any one of a uniform embossing structure on said reflective member, a non-uniform embossing structure on said reflective member, and an irregular structure on said reflective member.

17. The backlight unit according to claim 1, wherein said first surface is formed as a reflective sheet provided on said reflective member.

18. The backlight unit according to claim 17, wherein said reflective sheet is formed of micro polyethylene ether phthalein (MCPET) or aluminum+E60L.

19. A backlight unit comprising:
   a case defining a size of said backlight unit, said size having a length and a width;
   a plurality of lamps housed in said case, wherein said case is divided into at least a first area and a second area, a first portion of said plurality of lamps being provided in said first area and extending partially into said second area, a second portion of said plurality of lamps being provided in said second area and extending partially into said first area, such that ends of said second portion of said plurality of lamps in said second area overlap with ends of said first portion of said plurality of lamps in said first area;
   a reflective member provided below said plurality of tamps, for substantially uniform lighting; and
   a translucent light-scattering plate provided above said plurality of lamps,
   wherein a first segment of said translucent light-scattering plate, above said overlapped portions of said plurality of lamps, has a light-scattering characteristic which is different than the other segments of said translucent light-scatting plate.

20. The backlight unit according to claim 19, wherein the first segment is formed as an embossed surface on the translucent light-scattering plate by coating or printing light-scattering materials on the translucent light-scattering plate, or by embedding minute materials on the translucent light-scattering plate.

21. The backlight unit according to claim 19, wherein said translucent light-scattering plate includes a diffusion plate and at least one of a prism sheet and a protection sheet.

22. The backlight unit according to claim 21, wherein at least one of said diffusion plate, said prism sheet and said protection sheet includes a first segment, above said overlapped portions of said plurality of lamps, having a light-scattering characteristic which is different than the other segments of said at least one of said diffusion plate, said prism sheet and said protection sheet.

23. A backlight unit comprising:
a case defining a size of said backlight unit, said size having a length and a width;
a plurality of lamps housed in said case, wherein said case is divided into at least a first area and a second area, a first portion of said plurality of lamps being provided in said first area and extending partially into said second area, a second portion of said plurality of lamps being provided in said second area and extending partially into said first area, such that ends of said second portion of said plurality of lamps in said second area overlap with ends of said first portion of said plurality of lamps in said first area;
a reflective member provided below said plurality of lamps; and
a translucent light-scattering plate provided above said plurality of lamps,
wherein a first surface of said reflective member, underlying said overlapped portions of said plurality of lamps, at a juncture of said first and second areas, has a reflection characteristic which is different than surfaces of said reflective member underlying said first and second areas.

24. A backlight unit comprising:
a case defining a size of said backlight unit, said size having a length and a width;
a plurality of lamps housed in said case, wherein said case is divided into at least a first area and a second area, a first portion of said plurality of lamps being provided in said first area and extending toward said second area, a second portion of said plurality of lamps being provided in said second area and extending toward said first area, such that ends of said second portion of said plurality of lamps in said second area are adjacent to ends of said first portion of said plurality of lamps in said first area;
a reflective member provided below said plurality of lamps, and including a portion below said adjacent ends of said plurality of lamps, for reflecting and supplying light from said adjacent ends of the lamps; and
a first surface of said reflective member, underlying said adjacent ends of said plurality of lamps, at a juncture of said first and second areas, having a reflection characteristic which is different than surfaces of said reflective member underlying said first and second areas.

25. The backlight unit according to claim 24, wherein said first surface has a better reflection efficiency than said other surfaces of said reflective member.

26. The backlight unit according to claim 24, wherein said first surface is a more rugged surface than said other surfaces of said reflective member.

27. The backlight unit according to claim 24, wherein said length corresponds to a horizontal dimension and said width corresponds to a vertical dimension of an LCD display to receive said back light unit.

28. The backlight unit according to claim 24, wherein each lamp of said plurality of lamps is a cold cathode fluorescent lamp (CCFL), having terminals at each end, or an external electrode fluorescent lamp (EEFL).

29. The backlight unit according to claim 24, wherein said first and second areas are substantially equal in size, with each of said first and second areas having said width of said case and one-half said length of said case.

30. The backlight unit according to claim 24, wherein said case is divided into three areas, a third portion of said plurality of lamps being provided in a third area and extending toward said second area, such that ends of said third portion of said plurality of lamps in said third area are adjacent to ends of said second portion of said plurality of lamps in said second area; and
wherein said reflective member includes a second surface, underlying said adjacent ends of said plurality of lamps, at a juncture of said second and third areas, said second surface having a reflection characteristic which is different than surfaces of said reflective member underlying said first, second and third areas.

31. The backlight unit according to claim 30, wherein said first, second and third areas are substantially equal in size, with each of said first, second and third areas having said width of said case and one-third said length of said case.

32. The backlight unit according to claim 24, wherein each lamp of said plurality of lamps has a same length.

33. The backlight unit according to claim 24, wherein said plurality of lamps includes lamps of differing lengths.

34. The backlight unit according to claim 24, wherein said first surface is formed as concaved portions or protruding portions on said reflective member.

35. The backlight unit according to claim 24, wherein said first surface is formed as any one of a uniform embossing structure on said reflective member, a non-uniform embossing structure on said reflective member, and an irregular structure on said reflective member.

36. The backlight unit according to claim 24, wherein said first surface is formed as a reflective sheet provided on said reflective member.

37. The backlight unit according to claim 36, wherein said reflective sheet is formed of micro polyethylene ether phthalein (MCPET) or aluminum+E60L.

38. A backlight unit comprising:
a case defining a size of said backlight unit, said size having a length and a width;
a plurality of lamps housed in said case, wherein said case is divided into at least a first area and a second area, a first portion of said plurality of lamps being provided in said first area and extending toward said second area, a second portion of said plurality of lamps being provided in said second area and extending toward said first area, such that ends of said second portion of said plurality of lamps in said second area are adjacent to ends of said first portion of said plurality of lamps in said first area;
a reflective member provided below said plurality of lamps and including a portion below said adjacent ends of said plurality of lamps, for reflecting and supplying light from said adjacent ends of the lamps; and
a translucent light-scattering plate provided above said plurality of lamps.

39. The backlight unit according to claim 38, wherein a first segment of said translucent light-scattering plate, above said adjacent ends of said plurality of lamps, has a light-scattering characteristic which is different than the other segments of said translucent light-scatting plate.

40. The backlight unit according to claim 39, wherein the first segment is formed as an embossed surface on the translucent light-scattering plate by coating or printing light-scattering materials on the translucent light-scattering plate, or by embedding minute materials on the translucent light-scattering cover.

41. The backlight unit according to claim 38, wherein said translucent light-scattering plate includes a diffusion plate and at least one of a prism sheet and a protection sheet.

42. The backlight unit according to claim 41, wherein at least one of said diffusion plate, said prism sheet and said protection sheet includes a first segment, above said adjacent portions of said plurality of lamps, having a light-scattering characteristic which is different than the other segments of said at least one of said diffusion plate, said prism sheet and said protection sheet.

43. The backlight unit according to claim 38, wherein a first surface of said reflective member, underlying said adjacent ends of said plurality of lamps, at a juncture of said first and second areas, has a reflection characteristic which is different than surfaces of said reflective member underlying said first and second areas.

* * * * *